Dec. 8, 1953 W. J. COCHRAN 2,662,154
WINDSHIELD WIPER DEICER
Filed Sept. 11, 1951
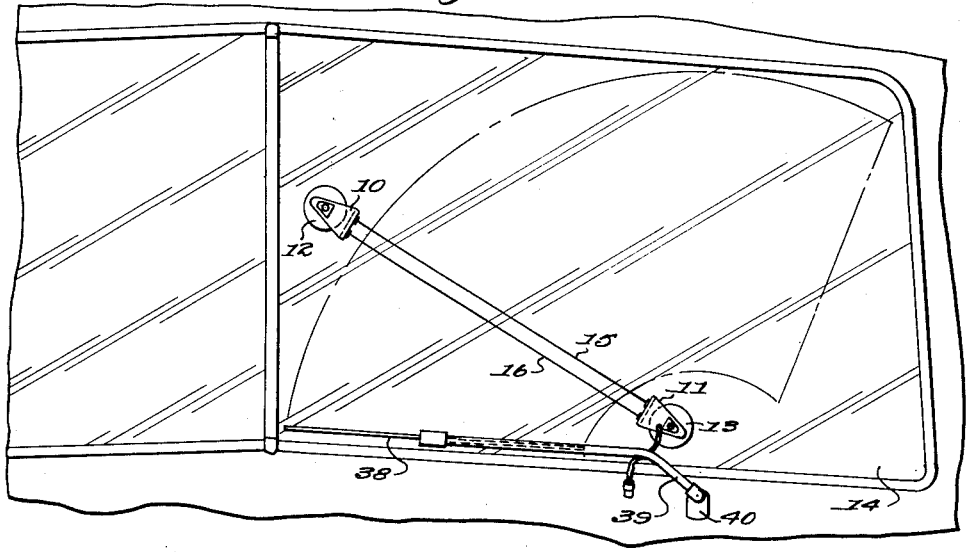
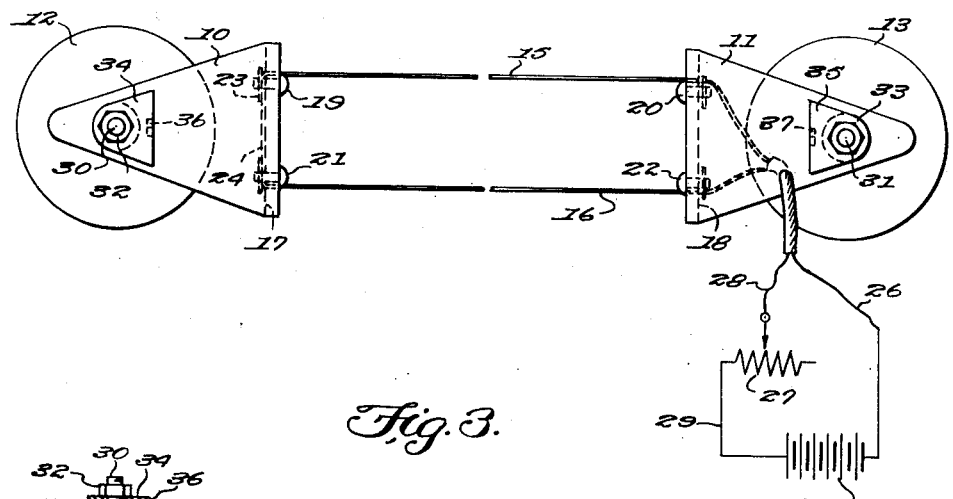
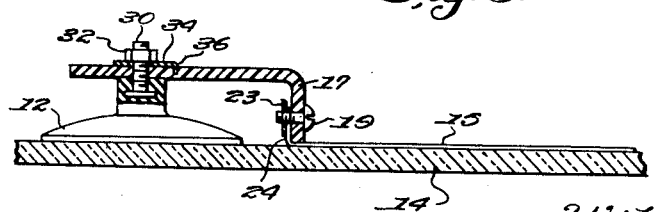
INVENTOR.
William J. Cochran,
BY Victor J. Evans & Co.
ATTORNEYS Patented Dec. 8, 1953

2,662,154

UNITED STATES PATENT OFFICE 2,662,154

WINDSHIELD WIPER DEICER

William Joseph Cochran, Cheyenne, Wyo.

Application September 11, 1951, Serial No. 246,032

4 Claims. (Cl. 219—19)

This invention is a device for removing snow, ice, and other foreign matter from windshield wipers to facilitate maintaining a clean windshield when driving through snow, sleet, and the like, and in particular a pair of electrically heated wires mounted on the face of a windshield and positioned so that the conventional windshield wiper is scraped by the wires as it travels back and forth over the outer surface of the windshield.

Various types of defrosters and deicers have been provided for use in combination with windshield wipers, however, in extreme conditions it is difficult to prevent ice and snow accumulating on the edge of the wiped element and this accumulation of snow, ice, mud, bugs and other foreign material eventually stops the operation of the wiper. With this thought in mind this invention contemplates a device for scraping these accumulations from the wiper element and also means for heating the scraping elements to remove accumulations of snow, ice and the like therefrom.

It has been found that a clean windshield prevents accumulations of snow and ice on the windshield and instead of attempting to heat the windshield or wiper better vision is provided by scraping the accumulations of ice and snow from the wiper element and melting the ice and snow from the scraper element with heat applied directly to the scraper element.

The object of this invention is, therefore, to provide means for mounting a heated windshield wiper element scraper on the surface of a windshield whereby the windshield wiper passes over the scraper element in its travel over the windshield.

Another object of the invention is to provide a heated windshield wiper cleaner that may be mounted on the surface of a windshield without making a permanent installation and without changing the windshield or wiper.

A further object of the invention is to provide an improved windshield wiper cleaner which is of a simple and economical construction.

With these and other objects and advantages in view the invention embodies a pair of square or twisted wires suspended between brackets mounted by vacuum cups on the surface of a windshield with means for connecting the wires to the battery of the vehicle on which the windshield is positioned and with means for regulating the amount of current supplied to the wires.

Other features and advantages of the invention will appear from the following description taken in connection with drawings wherein:

Figure 1 is a front elevational view illustrating a windshield of a motor vehicle with the windshield wiper cleaner installed thereon.

Figure 2 is a plan view of the windshield wiper cleaner showing the parts on an enlarged scale, with parts of the wires broken away and with the rheostat and battery circuit shown diagrammatically.

Figure 3 is a longitudinal section through one of the mounting brackets illustrating the method of attaching the wires to the vacuum cups.

Referring now to the drawings wherein like reference characters denote corresponding parts the windshield wiper cleaner of this invention includes a pair of mounting brackets 10 and 11, vacuum cups 12 and 13 for securing the mounting brackets to the surface of a windshield 14, and a pair of wires 15 and 16 which are suspended between and held in tension by the brackets and vacuum cups.

The brackets 10 and 11 are preferably formed of triangular shaped plates of insulating material with flanges 17 and 18, respectively, on the edges forming the bases of the triangles, and these flanges are provided with openings for mounting screws 19 and 20, which hold the ends of the wires 15 and 21 and 22, which hold the ends of the wires 16.

As illustrated in Figure 3 the screws extend through openings in the flanges and are threaded into washers 23 on the inner surfaces of the flanges, as shown in Figure 2, and the ends of the wires 15 and 16 in the bracket 10 are connected by a wire or plate 24 whereby with the opposite end of the wire 15 connected to a battery 25 by a wire 26 and the opposite end of the wire 16 connected to a rheostat 27 by a wire 28, the rheostat being connected to the battery 25 by a wire 29, the circuit is completed from the battery to the wires 15 and 16.

It is preferred to form the wires 15 and 16 of square or twisted material, however, it will be understood that wires of other suitable shapes in cross section may be used. The square or twisted wires scrape the windshield wiper element with more efficiency than round wires.

The vaccum cups 12 and 13 are provided with threaded studs 30 and 31, respectively, and the studs which extend through openings in the brackets 10 and 11 are provided with nuts 32 and 33, and plates 34 and 35, respectively, are positioned between the nuts and brackets. The inner edges of the plates 34 and 35 are provided with projections 36 and 37, respectively, that extend into indentations in the surfaces of the brackets.

With the parts formed in this manner the wires 15 and 16 are positioned on the outer surface of the windshield by pressing the vacuum cups against the surface of the windshield and by this means the wires may be stretched and held in tension whereby they are positioned against the surface of the windshield, as illustrated in Figure 3.

A conventional windshield wiper, as indicated by the numeral 38 and as carried by an arm 39, is pivotally mounted at the point 40 whereby the wiper travels in the path indicated by the dot and dash lines and in the course of its travels the edge of the wiper passes over the wires 15 and 16 so that accumulations of snow, ice, mud, bugs and other foreign materials on the edges of the wiper elements are scraped therefrom. With the wires heated snow, ice and the like readily melts whereby the wires are maintained in comparatively clean condition.

It will be understood that although only one of the cleaning elements is illustrated in the drawings, a plurality of the elements may be used on the same windshield wiper if desired.

With the use of the rheostat the temperature of the wires 15 and 16 is controlled.

It will be understood that modifications may be made in the design and arrangement of the parts without departing from the spirit of the invention.

What is claimed is:

1. A windshield cleaner comprising a pair of wires, an L-shaped bracket connected to the ends of the wires, means connected to said wires at the ends connected to one of the brackets for inducing a current into said wires for the heating thereof, means attached to each of said brackets for temporarily retaining the wires on the face of a windshield in the path of a wiper for the windshield and means for moving the wiper into contact with the wires.

2. A windshield cleaner comprising a wire, an L-shaped bracket connected to each end of the wire, means connected to said wire at the end thereof connected to one of the brackets for inducing a current into said wire for the heating thereof, means attached to each of said brackets for temporarily retaining the wire on the face of a windshield in the path of a wiper for the windshield and means for moving the wiper into contact with the wire.

3. A windshield wiper cleaner comprising a pair of mounting brackets, vacuum cups carried by the brackets for temporarily attaching the brackets to the face of a windshield of a motor vehicle, a flange extending from each bracket toward the windshield, a pair of wires extended between the flanges on the brackets and positioned beneath the edge of each flange to be located against the surface of a windshield upon which the brackets are mounted by said vacuum cups, means for connecting said wires to a battery for supplying current to the wires for the heating thereof, a wiper, means causing the wiper to travel over the surface of the windshield in the path of an arc into contact with said wires which are positioned on the windshield in the path of travel of said wiper.

4. A windshield wiper cleaner as described in claim 3 wherein means is provided for regulating the amount of current supplied to the wires.

WILLIAM JOSEPH COCHRAN.

References Cited in the file of this patent

UNITED STATES PATENTS

| Number | Name | Date |
| --- | --- | --- |
| Re. 21,213 | Zaiger | Sept. 19, 1939 |
| D. 164,656 | Taylor | Sept. 25, 1951 |
| 973,089 | Walter | Oct. 18, 1910 |
| 1,704,897 | Larimore | Mar. 12, 1929 |
| 1,720,027 | Bell | July 9, 1929 |
| 1,721,663 | Holzhauer | July 23, 1929 |
| 1,903,314 | Ornberg | Apr. 4, 1933 |
| 1,942,359 | Horton et al. | Jan. 2, 1934 |
| 2,103,146 | Cohen | Dec. 21, 1940 |
| 2,187,000 | Thorp | Jan. 16, 1940 |
| 2,195,862 | Janda | Apr. 2, 1940 |
| 2,416,572 | De Cordova | Feb. 25, 1947 |